May 29, 1962

C. W. MULLISON 3,036,852

STORES RACK

Filed Dec. 28, 1960

INVENTOR.
CHARLES W. MULLISON
BY
ATTORNEY

May 29, 1962 C. W. MULLISON 3,036,852
STORES RACK
Filed Dec. 28, 1960 3 Sheets-Sheet 2

INVENTOR.
CHARLES W. MULLISON
BY
ATTORNEY

May 29, 1962 C. W. MULLISON 3,036,852
STORES RACK

Filed Dec. 28, 1960 3 Sheets-Sheet 3

Fig. 3

INVENTOR.
CHARLES W. MULLISON
BY 
ATTORNEY

United States Patent Office 3,036,852
Patented May 29, 1962

3,036,852
STORES RACK
Charles W. Mullison, Norristown, Pa., assignor to the United States of America as represented by the Secretary of the Navy
Filed Dec. 28, 1960, Ser. No. 79,088
8 Claims. (Cl. 294—83)
(Granted under Title 35, U.S. Code (1952), sec. 266)

The invention described herein may be manufactured and used by or for the Government of the United States of America for governmental purposes without the payment of any royalties thereon or therefor.

The present invention relates to apparatus for suspension and release of stores and more particularly to an improved airborne rack having hooks for carrying, releasing and ejecting any one of a large variety of stores from an aircraft in flight.

Many endeavors have been made toward improved operations and weapons logistics insofar as reducing the number of types of apparatus required to carry and release the myriad of aerial bombs, nuclear weapons, torpedoes, mines, fuel tanks and other types of weapons or stores. One such endeavor was the establishment of the so-called 14-inch and 30-inch standard suspension systems for all bombs, rocket launchers, special weapons and equipment. The two systems each employ two tandem suspension lugs fixed to the top of the store for latching into corresponding hooks depending from a rack fixed in the carrier; but each differ in the spacing between the lugs or hooks along the longitudinal axis of the store or rack. Notwithstanding this step toward standardization, the growing number of types of stores with equally numerous variations in aerodynamic characteristics, physical dimensions, weight distribution, and other factors affecting the particular launching requirements have challenged the practicability and feasibility of continuing with only two such standard suspension systems. For example, two weapons which are both best adapted for the 14-inch suspension system may require an ejection force at different points along their longitudinal axes in order to obtain a particular attitude at the beginning of free flights. Confronted with the numerous combinations and permutations of ejector position and suspension systems, the known types of airborne racks are utterly incapable of continuing an operations and logistics program aimed toward both standardization and simplification.

Accordingly, it is an object of the present invention to provide a single store suspension, release and ejector rack for aircraft which will accommodate two standard suspension systems each employing two tandem suspension lugs fixed to the top of the store for latching into corresponding hooks depending from a rack fixed in the aircraft and each having different spacings between the lugs or hooks along the longitudinal axis of the store or rack, which may selectively impart an ejection force after the store is released, and which will be relatively simple, compact, convenient, practical and inexpensive.

Another object of the invention is to provide an improved suspension, release and ejector rack in which the point of application of the ejection force can be varied along the longitude of the store, with which the hooks can be adjusted for a given loading condition, and with which hook unlatching is initiated irrespective of conditions which may cause resistance to movement of the hooks.

Various other objects and advantages will appear from the following description of one embodiment of the invention, and the most novel features will be particularly pointed out hereinafter in connection with the appended claims.

Figure 1:
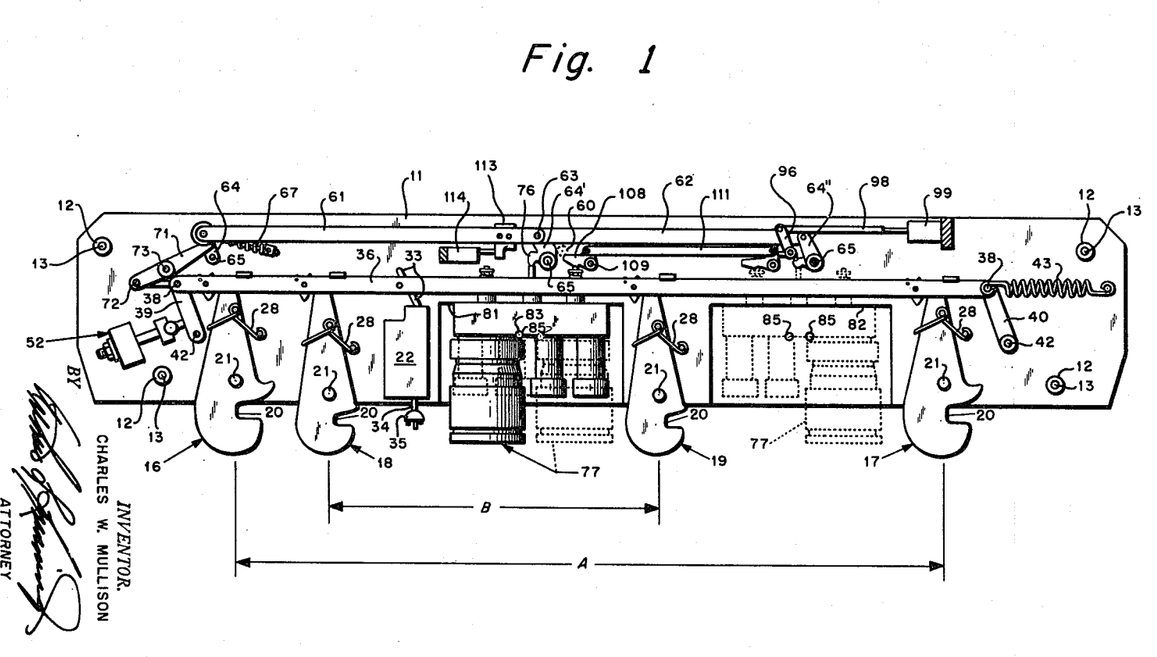
FIG. 1 represents a side elevation of the store suspension, release and ejector rack with one of its two side plates removed in order to illustrate the arrangement of the operating parts therebetween embodying the invention.
Figure 2:
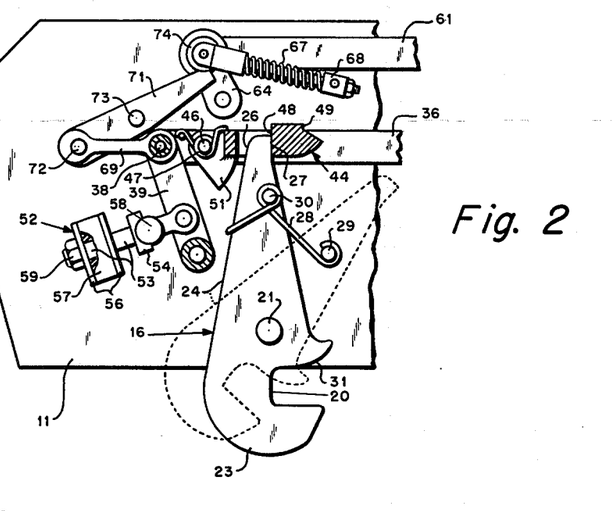
FIG. 2 represents an enlarged side elevation of a forward portion of the rack of FIG. 1 which includes one of the hooks and the trip mechanism.
Figure 4:
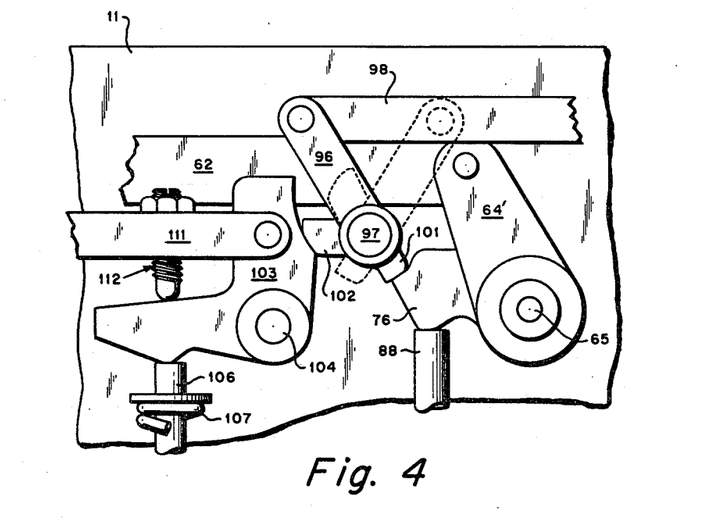
FIG. 4 represents in a side elevation an enlarged view of the safety interlock linkages of the rack illustrated in FIG. 1.

In the illustrated embodiment of the invention, the stores suspension, release and ejector rack has as its main supporting structure two elongated side plates 11 which are spaced oppositely to each other and in parallel planes as to their confronting flat surfaces by a plurality of bushing spacers 12, through bolts 13 and nuts (not shown). In FIGS. 1, 2, and 4, one of the two side plates 11 is removed in order to show the arrangement of the operating parts or elements contained therebetween. The side plates 11 may be provided with access and inspection holes not illustrated to provide for visual observation of the various mechanisms. The side plates 11 may be constructed for easy mounting in a streamlined fairing under the wings or fuselage of an aircraft and for attaching sway braces whenever the aircraft does not provide sway bracing as part of its airframe. A first pair of tandem suspension hooks 16 and 17 and a second pair of tandem suspension hooks 18 and 19 are pivoted about hook shafts 21 which, in turn, are supported at the ends thereof between the side plates 11; and their hook-wells 20 open rearwardly with respect to the rack or to the right, as shown in FIG. 1. Hence, release is effectuated when the load-supporting hooks 16 and 17 or 18 and 19 are rotated clockwise about their shafts 21. The spacing of the first pair of hooks 16 and 17 by the distance A and the second pair of hooks 18 and 19 by the distance B are such as to correspond with two suspension systems each incorporating two tandem suspension lugs fixed to the top of the store longitudinally spaced apart at the same distances A and B, respectively. For instance, if the 14-inch and 30-inch standard suspension systems were employed, the distances A and B would be 30 inches and 14 inches, respectively. The two pairs of hooks have been further positioned with respect to each other so that a single arming unit 22 fixed in the rack will align with the electrical outlet of the arming circuit in any weapon being suspended by either the first or second pair of hooks.

Each of the hooks 16, 17, 18 and 19 includes a lever portion 24 extending from its shaft 21 in a direction opposite from the hook-well 20 and provides thereby an actuating arm. The lever portion 24 tapers to a reduced cross section at its outer end and forms thereat flat bearing surfaces 26 and 27 on the forward and rearward edges, respectively. A clip-type spring 28, fixed to one end of the side plates 11 by pins 29 and 30, has its free end biased against the forward edge of the hook lever portion 24 thereby urging each of the hooks 16, 17, 18 and 19 in the clockwise direction (as illustrated) or toward the unlatching position. It will be noted from the position of the center of each hook shaft 21 with respect to the hook-well 20 that any load suspended from the hooks 16, 17, 18 and 19 will cause a clockwise moment which will also tend to rotate the hooks 16, 17, 18 and 19 clockwise and toward an unlatching position. It will be further noted that the upper edge of each hook-well 20 includes an arcuate surface 31 so that when the suspension lug of a store is hoisted against the surface 31, the hook is urged to rotate counterclockwise about the shaft 21 toward a latching position.

The arming unit 22 which is fixed between the side plates 11 at a prescribed position relative to the hooks 16, 17, 18 and 19 may be of any type capable of arming a store after its release. As illustrated, an actuating lever 33 operates an interlock switch in the unit 22 and connects an arming signal into the arming unit 22. The unit 22 also includes a spring-loaded pulley upon which a connecting cable 34 is wound. As the store falls away from the rack, the cable 34 unreels to a length of approximately 4 inches during which another switch in the arming unit 22 is closed to connect the arming signal into the arming circuit of the store. As the store continues to fall, the cable 34 pulls free from the store at a connector 35 and snaps back into the housing of the arming unit 22.

The hooks 16, 17, 18 and 19 are coordinated in their movement about the shafts 21 by means of a latching mechanism now to be explained. The latching mechanism includes a pair of rigid latch bars 36 running parallel to the confronting surfaces of the side plates 11 and for nearly their entire length. The latch bars 36 are maintained opposite to each other and at a fixed distance apart by spacer bushings (not shown) conveniently located at spaced intervals along the latch bars 36. Adjacent ends of the latch bars 36 support latch bar pins 38 which are pivotally connected to the outer ends of a pair of equal-length latch bar levers 39 and 40. The other ends of levers 39 and 40 rotate about lever pins 42 supported at their ends between the side plates 11. The position of each lever pin 42 and the length of the levers 39 and 40 are such that the outer end of the hook lever portion 24 of each hook 16, 17, 18 and 19 is flanked by the latch bars 36 when the hooks 16, 17, 18 and 19 are in the latched or substantially vertical position. A helical latch bar spring 43, connected under tension at its ends between the aft end of the latch bars 36 and the side plates 11, urge the latch bars 36 rearwardly toward a releasing or unlatching position.

Four latches 44 are respectively pivotally connected at their forward end about pins 46 fixed between the latch bars 36 at the four locations along the latch bars 36 where the latch bars 36 flank the lever portion 24 of the hooks 16, 17, 18 and 19. Each latch 44 has a coil spring 47 about its pin 46 fixed at one end to the latch bars 36 and urged against its latch 44 to urge the latter to rotate clockwise about the latch pin 46. A vertical opening 48 through each latch 44 is located relative to the outer end of the lever portion 24 of each hook 16, 17, 18 and 19 as to engage thereon when the latch bars 36 and any hook 16, 17, 18 or 19 is in the latched position; i.e., when the latch bars 36 are moved forwardly against the tension of spring 43 and the hooks 16, 17, 18 and 19 are rotated counterclockwise against the force of spring 28 so that the hooks are in a substantially vertical position. The extent of clockwise rotation of the latch mechanism 44 about the latch pin 46 is limited by a laterally extending stud 49 at the outer free end of the latch 44. The stud 49 abuts the upper surface of latch bars 36 in the latching position. The forward inner face of each opening 48 includes an arcuate extension 51 which curves downwardly and forwardly. The curved edge of extension 51 confronts the forward bearing surface 26 of the lever portion 24 and impinges the hooks 16, 17, 18 and 19 in a hammer-blow fashion when the latch bars 36 are suddenly released from the latched position. As the latch bars 36 continue to move rearwardly after the impact, the arcuate extensions 51 produce a rolling action on the bearing surfaces 26 as the hooks 16, 17, 18 and 19 rotate clockwise to an unlatching position.

To absorb the residual kinetic energy generated in the latch bars 36 by the spring 43 after actuation of the hooks 16, 17, 18 and 19, a shock absorber mechanism 52 is provided between the latch bar lever 39 and the side plates 11. A bolt 53 pivotally connected at one end to the latch bar lever 39 passes through a guide and stop ring 54 and a resilient shock-absorbing ring 57 retained at its ends by a pair of washers 56. The guide and stop ring 54 is fixed to a journal 58 supported at its ends between the side plates 11 thereby permitting the ring 54 to be maintained aligned coaxially with the bolt 53. The resilient ring 57 and its washers 56 are kept from sliding off of the bolt 53 by a lock nut 59. It is thus seen that when the latch bars 36 are released from the latched position, the latch bar lever 39 rotates clockwise carrying the bolt 53 rearwardly. Shock absorption commences when the rearwardly disposed washer 46 contacts the guide and stop ring 54. Further clockwise rotation of the latch bar lever 39 compresses the resilient ring 57 and dissipates the kinetic energy in the hooks 16, 17, 18 and 19.

The latch bars 36 are selectively maintained in a latched position against the force of the latch bar spring 43 by means of a release mechanism now to be explained. The release mechanism includes a forward elongated link 61 and a rearward elongated link 62 connected end to end by a pin 63 forming thereby a continuous linkage extending parallel to the side plates 11 and to the latch bars 36. The links 61 and 62 are pivotally connected at the two outer ends and at the pin 63 by lever arms 64, 64', 64" articulated about pins 65 which are fixed at their ends to the side plates 11. The links 61 and 62 are normally biased toward a forward position by a release compression spring 67 which is inserted and compressed over a shaft and guide mount 68 pivotally connected to the side plates 11.

The latch bars 36 are held in the latching or forward position by the release mechanism through a lock and trip mechanism comprising a drag link 69 pivotally connected at its ends between one end of a cocking lever 71 and the forward latch bar pin 38. The connection between the drag link 69 and the lever 71 is by means of an eccentric shaft 72 having its pivotal axis for the lever 71 displaced a relatively small distance, compared to the length of the lever 71, from its pivotal axis for the drag link 69. The angular position of the eccentric shaft 72 with respect to the lever 71 can be adjusted and locked by convenient means. In this manner, the latch bars 36 can be shifted forward or rearward with respect to the hook shafts 21 until the rearward bearing surface 27 is parallel to the rearward inner face of the opening 48. A shaft 73 fixed at a point intermediate of the ends of the lever 71 is pivotally supported at its ends between the side plates 11. By a hexagonal cocking bolt fixed to one end of the shaft 73 and extending through one of the side plates 11, not shown, the lever 71 can be manually rotated about the axis of shaft 73. A cocking lever roller 74, rotatably connected at the forward end of the link 61, cooperates with the free end of the lever 71 in such a manner that, when the lever 71 is rotated in a clockwise direction to the latching position, its free end moves the roller 74 and links 61 and 62 rearwardly until they are clear to be moved forwardly again by the force of the spring 67. When the roller 74 is in the forward position over the lever 71, the latter is prevented from returning to the unlatching position to which it is urged through the drag link 69, the latch bars 36 and the latch spring 43.

The intermediate and rearward lever arms 64' and 64" of the release mechanism differ from the forward lever arm 64 by an actuating arm 76 which is fixed to and rotatable with each. The actuating arms 76 are selectively rotated clockwise to an unlatching position by the ejector assembly 77 which will now be explained. Main structural support for the ejector assembly 77 is provided by the cylinder head or breech 78 whose upper surface along its opposite sides seats against downwardly facing bearing surfaces 81 formed by recesses in opposite faces of the side plates 11 between the hooks 18 and 19. Similar bearing surfaces 82 formed by recesses in the side plates 11 between the hooks 19 and 17 provide an alternative position for the ejector assembly 77 along the rack, as shown in phantom outline in FIG. 1. The ejector assembly 77 is supported in the inserted position against the surface 81 or 82 by a removable pin 83 which extends through one pair of four pair of aligned holes 85 in the side plates 11 and which aligns with a groove 84 in the lower surface of the breech 78. The breech 78 includes a chamber 86 communicating with a vertically acting breech piston 87 positioned in the upper wall midway between the ends and the sides of the breech 78. An extension 88 fixed to the breech piston 87 slidably extends upwardly through the upper wall. The actuating arms 76 are positioned along the rack so that they are vertically aligned for actuation by the piston extension 88 when the ejector assembly 77 is inserted against either surface 81 or 82. The upper surface 79 of the breech 78, being symmetrical about the axis of the piston extension 88, allows the ejector assembly 77 to be inserted against either of the surfaces 81 or 82 in either of two positions 180 degrees displaced about the symmetrical axis. The pin 83 will simply fit into any of the pairs of holes 85 in the side plates 11 which align with the groove 84.

A telescoping type of cylinder-piston 89 is threaded to the lower surface at one end of the breech 78 with the inner surfaces of its sliding members communicating with the chamber 86. The threaded connection provides means for screwing the piston head down by hand until tight contact is made by its lower surface of foot 94 against a store suspended by the hooks 16 and 17 or hooks 18 and 19.

The other end of the lower surface of the breech 78 has two cartridge cylinders 91 and 92 internally communicating with the chamber 86, each adapted to receive an explosive charge 92 which is electrically ignited through an ignition cable 93. It is contemplated that the explosive charges 92 be varied in type and in their combination to provide a force at the ejector piston 89 which will produce a desired attitude for the released store at the beginning of free flight. Inasmuch as the axis of the cylinder-piston 89 is displaced from the vertical symmetrical axis of the surface 79 of the breech 78, the position of the ejection force along the length of the rack, and hence the store suspended therefrom can be varied among any one of four distinct points. The positions are obtained simply by inserting the ejector assembly 77 against the surface 81 with the cylinder-piston 89 disposed either forwardly or rearwardly, or by inserting the ejector assembly 77 against the surface 82 with the ejector piston 89 disposed either forwardly or rearwardly.

When the explosive charges 92 are electrically detonated through the cables 93 at a desired instant of store release, a gas pressure generated thereby will firstly force the piston 87 and extension 88 upward against the confronting release bar actuating arm 76 and initiate the hook unlatching sequence. The pressure in the chamber 86 will secondly urge the cylinder-piston 89 downward against the top of the store which has by this time been released from the hooks 16 and 17 or hooks 18 and 19. The upward travel of the extension 88 is limited by the length of the stroke of the piston 87, hence the forces transferred through the release mechanism should not exceed the reaction force imparted by the spring 67.

It is contemplated that a safety pin 60 and a flag, not shown, which is attached thereto be inserted through the side plates 11 to engage and lock the linkages 61 and 62 so that they cannot be moved toward the right from the latched position to the unlatched position until the pin 60 is removed. Being inaccessible while airborne, this operation must be performed while the aircraft is on the ground; hence it does not afford a safety interlock during flight. Therefore a remote-actuated safety interlock is also provided which comprises a cam lever 96 pivotally connected at one end to the side plates 11 by means of a pin 97. The other end of the lever 96 is pivotally connected at one end of an actuating rod 98 which in turn is fixed to the output of a reciprocating-type servo motor 99. The motor 99 is of the type which can be remotely actuated into either of two positions. In the forward position shown, the motor 99 holds a first cam surface extension 101 of the cam lever 96 against a cam surface on the actuating arm 76 when the release mechanism is in the latched position as shown. Because of the link 62 interconnecting the rearward and intermediate lever arms 64, the intermediate actuating arm 76 also is restrained from clockwise rotation.

A second cam surface extension 102 from the cam lever 96 acts against another cam surface on a bellcrank 103 which is pivotally connected to the side plates 11 through a pin 104. The end of the bellcrank 103 opposite from the cam surface includes an arcuate surface which acts downwardly against the upper end of either of two poppet valves 106 having its stem extending upwardly through the upper wall of the breech 78. The confronting poppet valve 106 is urged against the actuating surface of its respective bellcrank 103 by poppet valve springs 107. In the position shown in FIGS. 1 and 4, the cam extension 102 compresses the springs 107 through the bellcrank 103. The two poppet valves 106 are symmetrically positioned about the transverse axis of the breech 78 so that the ejector assembly 77 can be rotated 180 degrees about a vertical axis for the purpose of shifting the ejector piston 89 and still have one of the poppet valves 106 acting against the bellcrank 103. A second bellcrank 108, pivotally connected to the side plates 11 through a pin 109, follows the motion of the bellcrank 103 by means of the connecting link 111. It is thus seen that irrespective of which surface 81 or 82 the ejector assembly is inserted against and of which position the piston 89 is oriented along the suspension and release rack, there will always be a poppet valve 106 confronting the actuating surface of the bellcrank 103 or 108.

A set-screw and lock-nut assembly 112 located in the connecting link 111 provides for adjustment between the bellcranks 103 and 108 and the top of the poppet valves 106. When the ejector assembly 77 is locked in position against the surface 81 or 82 by the removable pin 83, each bellcrank 103 and 108 should just clear the top of the poppet valves 106 when the valves are in the closed position.

For safety interlock, the servo motor 99 moves the actuating rod 98 forwardly to rotate the cam lever 96 counterclockwise, the bellcranks 103 and 108 are thereby forced downwardly depressing the poppet valve 106 against the spring 107, thus opening a bypass in the chamber 86 of the breech 78. Now should the ejector assembly charges 92 be accidentally detonated, even though the safety pin 60 has not been removed, the gas pressure generated in the chamber 86 thereby will be vented to atmosphere through the bypass opened by the poppet valve 106.

Where an ejector is not required or for emergency unlatching, an auxiliary release unit is provided which actuates directly against the release bar linkages 61 and 62 through a step member 113 fixed thereto. A force is selectively imparted against the step member 113 from the left or forward direction by a cartridge-actuated motor 114, thereby moving the links 61 and 62 rearwardly toward the releasing position thereby unlatching the hooks. Accidental firing of the auxiliary release unit cannot move the linkages 61 and 62 rearwardly if the safety pin 60 is in place or if the safety interlock of the cam extension 101 is engaged against the actuating arm 76 of the lever arm 64.

The operation of the suspension, release and ejector rack will be summarized as follows. In the unlatched position with the safety pin 60 removed and the remote actuated safety interlock motor 99 in the rearward position, the cocking lever 71 is free from under the roller 74 to position itself at its extreme counterclockwise position due to the rearward urging of spring 43 on the latch bars 36 and drag link 69. The latch bars 36 in the rearward position clear the latch 44 of the hook position 24 and the clip springs 28 thereby urge the hooks 16, 17, 18 and 19 to a clockwise position shown by the broken lines in FIG. 2.

The suspension, release and ejector rack is latched, in the manner previously described, by manually rotating the shaft and cocking bolt 73 clockwise against the tension of spring 43 until the free end of lever 71 clears the lower side of the roller 74. During rotation of the lever 71, the rearward face of the lever 71 engages the roller 74 and begins to move the release bar links 61 and 62 rearwardly from their normally forward position, as shown, against the compression of spring 67. Simultaneously, rotation of the lever 71 pulls the drag link 69 and latch bars forwardly. A distinct snap is heard as the roller 74 seats itself over the lever 71 and the latch bars 36 are cocked. It is contemplated that the seating of the lever 71 can also be visually observed through a forward inspection window, not shown, located in the side plates 11. The safety pin 60 can now be inserted through the side plates 11 to engage and lock the release mechanism in its latched position. It will be noted that the cocking of the latch bars 36 does not latch the hooks 16, 17, 18, and 19 because the upper end of the hook lever portion 24 remains clear of the latch mechanism 44.

Figure 3:
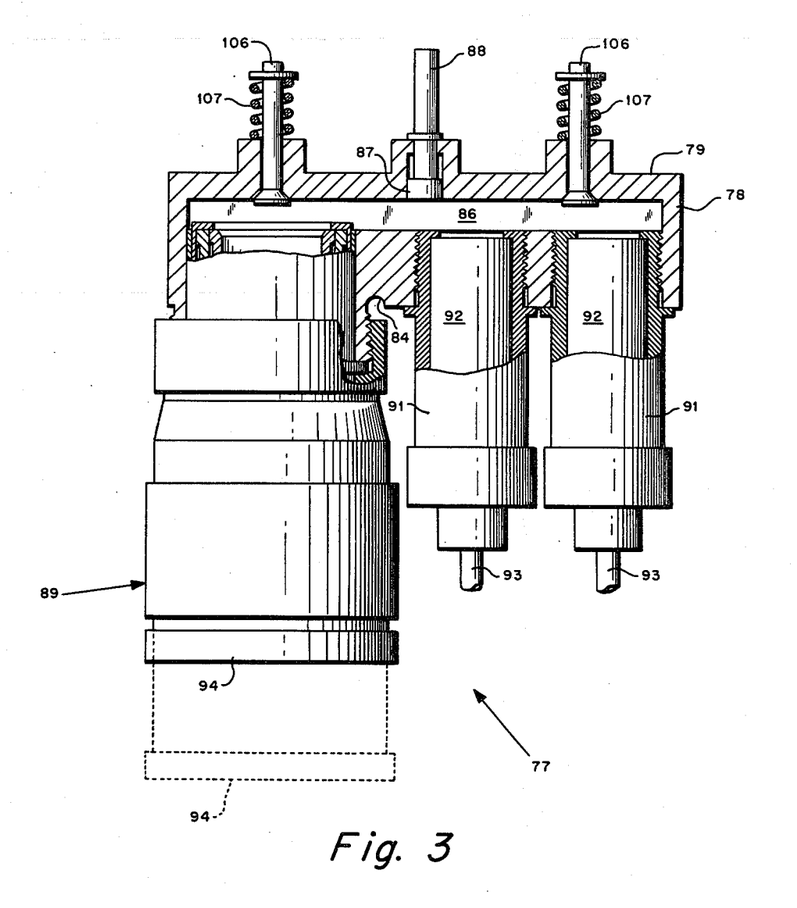
FIG. 3 represents in enlarged cross section a side elevation of ejector assembly of the rack of FIG. 1.

For stores which require separation augmentation after release from the suspension, release and ejector rack, the selection of an optimum charge 92 combination and the location and position of the ejector assembly 77 relative to the rack hooks 16, 17, 18 and 19 must be decided based on flight test results. The aerodynamic behavior of a store immediately upon release will normally dictate the selection. After the insertion of the selected charges 92 into the respective cylinders 91 of the ejector unit 77, the cylinders 91 are replaced and tightened until secure. The ejector unit 77 is installed with ejector foot 94 in one of the four locations described hereinabove and the ejector locking pin 83 is inserted to lock the breech 78 into the side plates 11 at either of the surfaces 81 or 82. Of course, the cylinder-piston 89 must be fully retracted as represented by the solid lines in FIG. 3. Appropriate electrical connections, not shown, are made to the ignition cables 93. The rack is now ready to accept a store.

As a store is raised up to the rack, its suspension lugs are fed into the hook wells 20 of a corresponding pair of the standard spaced hooks 16 and 17 or 18 and 19 thereby contacting the arcuate surfaces 31 in the hook wells. Continued upward movement of the suspension lugs imparts a counterclockwise movement about the hook pins 21 in opposition to the clockwise force of the spring clips 28. The hooks 16 and 17 or 18 and 19 thus rotate counterclockwise toward a substantially vertical position. During their counterclockwise rotation, the bearing surfaces 26 of the hook levers 24 contact lower arcuate surfaces of the latches 44 causing them in turn to rotate counterclockwise against the force of the latch springs 47. When the bearing surfaces 27 become disposed forwardly of the rearward edge of the latch openings 48, the springs 47 return the latch 44 clockwise to latched positions shown in FIG. 2. The suspension lugs of the store can now be supported by the lower bearing surfaces of the hook wells 20 because clockwise rotation of the hook is prevented by the latches 44 at the surfaces 27. The hooks 16 and 17 or 18 and 19 can be heard to snap into the locked position and the latch 44 can be observed through appropriately positioned inspection holes in the side plates 11.

After the store is secured in the hooks, anti-sway braces, not shown, can be secured and the ejector foot 94 can be screwed down by hand until a tight contact is made against the top of the store. Final arming of the store as by connecting the arming unit 22 to the store by the connector 35 can also be done at this time.

During loading and until the time of release of the store, it is important that the safety interlock motor 99 be in its extended position whereby cam extensions 101 and 102, respectively, lock the extension 88 of the breech piston 87 in its retracted position and depress the poppet valve 106 to the open or bypass position.

Under normal operating conditions, the safety pin 60 is not removed until just prior to takeoff of the aircraft. Safety interlock after takeoff, however, is still maintained by the cam extensions 101 and 102 until the aircraft has reached a target area at which event the servo motor 99 is selectively actuated by a remote means, not shown. The motor 99 retracts causing the cam lever 96 to rotate clockwise and disengage the cam extensions 101 and 102 from the bellcrank 103 and actuating arm 76, respectively.

Detonation of the charges 92 by an electrical pulse generates a gas pressure in the chamber 86. Initially, the rising pressure forces the extension 88 upward to rotate the release bar lever arm 64' or 64'' and move the linkages 61 and 62 rearwardly. The lever 71, thus freed from the roller 74, is pulled counterclockwise by the spring 43 connected through the latch bars 36 and the drag link 69. Due to a "lost motion" space between the forward surface of the latch openings 48 and the forward flat bearing surfaces 26, a hammer blow is imparted to the hooks 16 and 17 or 18 and 19 thereby insuring their initial movement against any freezing condition and rapid release of the store. The hammer blow is of sufficient force to cause the hooks to rotate clockwise suddenly so that the lower surface of the hook wells 20 move out of contact with the suspension lugs of the store. The arcuate extensions 51 maintain a rolling contact against the surfaces 26 as the latch bars 36 continue moving rearwardly. In this manner, scuffing of the hook surfaces, usually caused when the hook is rotated to a released position, is eliminated. The latch bars 36 are stopped in their rearward travel by the shock absorber mechanism 52 in the manner previously described.

The auxiliary release unit, which includes the motor 114 acting against the step member 113, provides an alternate or emergency method of releasing the store should the ejector unit 77 be inoperative or fail. The explosive cartridge in the motor 114, when detonated by a separate electrical circuit not shown, forces the piston of the motor 114 rearwardly against the step member 113 mounted in the release mechanism. The links 61 and 62 also move rearwardly to actuate the latching mechanism and unlatch the hooks.

To avoid concentrated stresses, it is essential that the rearward surface of the opening 48 in the latch 44 lie flat against the bearing surface 27 of the hook lever portion 24 when the hooks 16 and 17 or 18 and 19 are in the latched position. The eccentric 72 provides a means for making this adjustment in variations between the mating surfaces. When the latches 44 are in proper alignment a pin, not shown, may be inserted to lock the eccentric 72 relative to the lever 71.

It is thus apparent that the ejector assembly 77 can be installed in four different mounting positions along the longitudinal axis of the suspension, release and ejector rack whereby a variety of locations for separation augmentation is available to accommodate the peculiar requirements of each of the stores now in service and also the new stores being developed. Several explosive charge combinations can be used to vary the magnitude of the ejector force. It also is apparent that the reliability of the suspension, release and ejector rack has been considerably improved by the inclusion of hammer blow actuation of the hooks and that critical stress concentration in the latch mechanism and the hooks under extreme loads can be considerably reduced.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:
1. A rack for a store of the type having a pair of tandem suspension lugs longitudinally spaced in one of two preselected distances, comprising, in combination: an elongated frame, a first pair of hooks pivotally connected in tandem to said frame and correspondingly spaced for engaging the suspension lugs of one of the spacings, a second pair of hooks pivotally connected in tandem to said frame and correspondingly spaced for engaging the suspension lugs of the other of the spacings, an arming unit fixed to said frame, said second pair of hooks being further longitudinally arranged between said first pair of hooks along said frame whereby an electrical outlet in the store can align with said unit, a latch bar pivotally connected at a spaced interval to a first pair of equal-length lever arms, said first pair of arms being articulated to said frame, an arming lever operatively connected between said arming unit and said latch bar, said latch bar including four pivoted latches arranged along said bar relative to each of said first and second pairs of hooks whereby each latch engages an upper extension of its corresponding hook in the latching position, force exerting means connected between said latch bar and said frame for urging said latch bar to the unlatching position thereby disengaging said latches, each of said latches having a surface confronting and spaced from the upper extension of its corresponding hook for imparting a sudden force to the extension when said latch bar is released to an unlatching position, cocking lever means pivotally connected intermediate of its ends to said frame and pivotally connected at one of its ends to said latch bar, a release bar pivotally connected at a spaced interval to a second pair of equal-length lever arms, said second pair of arms being articulated to said frame, said release bar arranged relative to the other end of said cocking lever means for preventing said cocking lever means to rotate and for releasing said cocking lever means for rotation to the unlatching position when said release bar is respectively positioned in a nonreleasing or a releasing position, force exerting means connected between said release bar and said frame for urging said release bar to the nonreleasing position, a first actuating lever fixed to one of said second pair of arms for rotation therewith, a second actuating lever fixed to the other of said second pair of arms for rotation therewith, a first downward surface formed by a first recess in said frame located between said second pair of hooks, a second downward surface formed by a second recess in said frame between one of said first pair of hooks and one of said second pair of hooks, at least one ejector unit including an elongated breech formed at its upper surface to seat against either said first or second surface with its longitudinal axis parallel to said frame, said breech having its upper seating surface symmetrically configured about a vertical center of said ejector unit, a plunger slidably extending upwardly from said breech at the vertical center, said first actuating lever having its free end positioned at the vertical center and engaging said plunger when said ejector unit is inserted against said first surface, said second actuating lever having its free end positioned at the vertical center and engaging said plunger when said ejector unit is inserted against said second surface, pin means for securing said ejector unit against either said first or second surface, piston means operatively connected at one end of said breech means for producing a downward force against the store, explosive cartridge means connected at the opposite end of said breech, passage means in said breench communicating between said cartridge means, said plunger and said piston means, an eccentric means pivotally connecting said cocking lever means and said latch bar for adjusting the relative position of said latch bar when in the latching position to the pivotal axis of each of said hooks, auxiliary release means fixed to said frame for forcing said release bar to said releasing position, and shock absorber means connected between said frame and at least one of said first pair of arms for absorbing the shock otherwise produced as said latch bar reaches the unlatching position.

2. A rack for a store of the type having a pair of tandem suspension lugs longitudinally spaced in one of two preselected distances, comprising, in combination: an elongated frame, a first pair of hooks pivotally connected in tandem to said frame and correspondingly spaced for engaging the suspension lugs of one of the spacings, a second pair of hooks pivotally connected in tandem to said frame and correspondingly spaced for engaging the suspension lugs of the other of the spacings, said second pair of hooks being further longitudinally arranged between said first pair of hooks along said frame, a latch bar pivotally connected at a spaced interval to a first pair of equal-length lever arms, said first pair of arms being articulated to said frame, said latch bar including four pivoted latches arranged along the said latch bar relative to each of said first and second pairs of hooks whereby each latch engages an upper extension of its corresponding hook in the latching position, force exerting means connected between said latch bar and said frame for urging said latch bar to the unlatching position thereby disengaging said latches, each of said latches having a surface confronting and spaced from the upper extension of its corresponding hook for imparting a sudden force to the extension when said latch bar is released to an unlatching position, cocking lever means pivotally connected intermediate of its ends to said frame and pivotally connected at one of its ends to said latch bar, a release bar pivotally connected at a spaced interval to a second pair of equal-length lever arms, said second pair of arms being articulated to said frame, said release bar arranged relative to the other end of said cocking lever means for preventing said cocking lever means to rotate and for releasing said cocking lever means for rotation to the unlatching position when said release bar is respectively positioned in a nonreleasing or a releasing position, force exerting means connected between said release bar and said frame for urging said release bar to the nonreleasing position, a first actuating lever fixed to one of said second pair of arms for rotation therewith, a second actuating lever fixed to the other of said second pair of arms for rotation therewith, a first downward surface formed by a first recess in said frame located between said second pair of hooks, a second downward surface formed by a second recess in said frame between one of said first pair of hooks and one of said second pair of hooks, at least one ejector unit including an elongated breech formed at its upper surface to seat against either said first or second surface with its longitudinal axis parallel to said frame, said breech having its upper seating surface symmetrically configured about a vertical center of said ejector unit, a plunger slidably extending upwardly from said breech at the vertical center and engaging said plunger, said first actuating lever having its free end positioned at the vertical center when said ejector unit is inserted against said first surface, said second actuating lever having its free end positioned at the vertical center and engaging said plunger when said ejector unit is inserted against said second surface, pin means for securing said ejector unit against either said first or second surface, piston means operatively connected at one end of said breech means for producing a downward force against the store, explosive cartridge means connected at the opposite end of said breech, passage means in said breech communicating between said cartridge means, said plunger and said piston means, and an eccentric means pivotally connecting said cocking lever means and said latch bar for adjusting the relative position of said latch bar when in the latching position to the pivotal axis of each of said hooks.

3. A rack for a store of the type having a pair of tandem suspension lugs longitudinally spaced in one of two preselected distances, comprising, in combination: an elongated frame, a first pair of hooks pivotally connected in tandem to said frame and correspondingly spaced for engaging the suspension lugs of one of the spacings, a second pair of hooks pivotally connected in tandem to said frame and correspondingly spaced for engaging the suspension lugs of the other of the spacings, said second pair of hooks being further longitudinally arranged between said first pair of hooks along said frame, a latch bar pivotally connected at a spaced interval to a first pair of equal-length lever arms, said first pair of arms being articulated to said frame, said latch bar including four pivoted latches arranged along the said latch bar relative to each of said first and second pairs of hooks whereby each latch engages an upper extension of its corresponding hook in the latching position, each of said latches having a surface confronting and spaced from the upper extension of its corresponding hook for imparting a sudden force to the extension when said latch bar is released to an unlatching position, cocking lever means pivotally connected intermediate of its ends to said frame and pivotally connected at one of its ends to said latch bar, a release bar pivotally connected at a spaced interval to a second pair of equal-length lever arms, said second pair of arms being articulated to said frame, said release bar arranged relative to the other end of said cocking lever means for preventing said cocking lever means to rotate and for releasing said cocking means for rotation to the unlatching position when said release bar is respectively positioned in a nonreleasing or a releasing position, force exerting means connected between said release bar and said frame for urging said release bar to the nonreleasing position, a first actuating lever fixed to one of said second pair of arms for rotation therewith, a second actuating lever fixed to the other of said second pair of arms for rotation therewith, a first downward surface formed by a first recess in said frame located between said second pair of hooks, a second downward surface formed by a second recess in said frame between one of said first pair of hooks and one of said second pair of hooks, at least one ejector unit including an elongated breech formed at its upper surface to seat against either said first or second surface with its longitudinal axis parallel to said frame, said breech having its upper seating surface symmetrically configured about a vertical center of said ejector unit, a plunger slidably extending upwardly from said breech at the vertical center, said first actuating lever having its free end positioned at the vertical center and engaging said plunger when said ejector unit is inserted against said first surface, said second actuating lever having its free end positioned at the vertical center and engaging said plunger when said ejector unit is inserted against said second surface, pin means for securing said ejector unit against either said first or second surface, piston means operatively connected at one end of said breech means for producing a downward force against the store, explosive means connected at the opposite end of said breech, and passage means in said breech communicating between said cartridge means, said plunger and said piston means.

4. A rack for a store of the type having a pair of tandem suspension lugs longitudinally spaced in one of two preselected distances, comprising, in combination: an elongated frame, a first pair of hooks pivotally connected in tandem to said frame and correspondingly spaced for engaging the suspension lugs of one of the spacings, a second pair of hooks pivotally connected in tandem to said frame and correspondingly spaced for engaging the suspension lugs of the other of the spacings, said second pair of hooks being further longitudinally arranged between said first pair of hooks along said frame, a latch bar pivotally connected at a spaced interval to a first pair of equal-length lever arms, said first pair of arms being articulated to said frame, said latch bar including four pivoted latches arranged along the said latch bar relative to each of said first and second pairs of hooks whereby each latch engages an upper extension of its corresponding hook in the latching position, each of said latches having a surface confronting and spaced from the upper extension of its corresponding hook for imparting a sudden force to the extension when said latch bar is released to an unlatching position, cocking lever means pivotally connected intermediate of its ends to said frame and pivotally connected at one of its ends to said latch bar, a release bar pivotally connected at a spaced interval to a second pair of equal-length lever arms, said second pair of arms being articulated to said frame, said release bar arranged relative to the other end of said cocking lever means for preventing said cocking lever means to rotate and for releasing said cocking lever means for rotation to the unlatching position when said release bar is respectively positioned in a nonreleasing or a releasing position, force exerting means connected between said release bar and said frame for urging said release bar to the nonreleasing position, release means fixed to said frame for forcing said release bar to said releasing position, and shock absorber means connected between said frame and at least one of said first pair of arms for absorbing the shock otherwise produced as said latch bar reaches the unlatching position.

5. A rack for a store of the type having a suspension lug means, comprising, in combination: a frame, hook means pivotally connected to said frame for engaging the suspension lug means, a latch means pivotally connected to said frame arranged relative to said hook means whereby it engages an upper extension of said hook means in the latching position, said latch means having a surface confronting and spaced from an upper extension of said hook means for imparting a sudden force to the extension when said latch means is released to an unlatching position, cocking lever means pivotally connected intermediate of its ends to said frame and pivotally connected at one of its ends to said latch means, a release means pivotally connected to said frame and arranged relative to the other end of said cocking lever means for preventing said cocking lever means to rotate and for releasing said cocking means for rotation to the unlatching position when said release means is respectively positioned in a nonreleasing or a releasing position, force exerting means connected between said release means and said frame for urging said release means to the nonreleasing position, and eccentric means pivotally connecting said cocking lever means and said latch means for adjusting the relative position of said latch means when in the latching position to the pivotal axis of said hook means.

6. A rack for a store of the type having a pair of tandem suspension lugs longitudinally spaced in one of two preselected distances, comprising, in combination: a frame, a first suspension means pivotally connected to said frame for engaging the suspension lugs of one of the spacings, a second suspension means pivotally connected to said frame for engaging the suspension lugs of the other of the spacings, latch means pivotally connected to first lever arm means, said first arm means being articulated to said frame, said latch means including pivoted elements arranged along the said latch means relative to each of said first and second suspension means whereby each of said elements engages its corresponding suspension means in the latching position, each of said elements having a surface confronting and spaced from its corresponding suspension means for imparting a sudden force thereto when said latch means is released to an unlatching position, means for releasing said latch means, and eccentric means pivotally connecting said release means and said latch means for adjusting the relative position of said latch means to the pivotal axes of said suspension means.

7. An ejector for a stores rack comprising: an elongated breech formed on its upper surface to seat against a downward surface in the frame of the rack with its longitudinal axis parallel to the frame, said breech having its upper seating surface symmetrically configured about a vertical center of said ejector, a plunger slidably extending upwardly from said breech at the vertical center and positioned for engaging the release mechanism of the rack when said ejector is inserted against the downward surface, pin means for securing said ejector against the downward surface, piston means operatively connected at one end of said breech means for producing a downward force against a store suspended from the rack, explosive cartridge means connected at the opposite end of said breech, and passage means in said breech communicating between said cartridge means, said plunger and said piston means.

8. An ejector for a stores rack comprising: a breech formed to seat against a surface formed in said rack having its seating surface symmetrically configured about a slidable means extending upwardly from said breech at the symmetrical axis for engaging release mechanism of the rack when said ejector is inserted against the downward surface, piston means operatively connected at one end of said breech means for producing a downward force against a store suspended from the rack, gas pressure means connected at the opposite end of said breech, and passage means in said breech communicating between said pressure means, said slidable means and said piston means.

References Cited in the file of this patent
UNITED STATES PATENTS

| | | |
|---|---|---|
| 2,889,746 | Glassman et al. | June 9, 1959 |
| 2,937,899 | Murphy | May 24, 1960 |

UNITED STATES PATENT OFFICE
CERTIFICATE OF CORRECTION

Patent No. 3,036,852                            May 29, 1962

Charles W. Mullison

It is hereby certified that error appears in the above numbered patent requiring correction and that the said Letters Patent should read as corrected below.

Column 5, line 3, for "surface" read -- surfaces --; column 9, line 67, for "breench" read -- breech --; column 11, line 26, after "cocking" insert -- lever --; column 12, line 39, before "means" insert -- lever --.

Signed and sealed this 11th day of September 1962.

(SEAL)
Attest:

ERNEST W. SWIDER
Attesting Officer

DAVID L. LADD
Commissioner of Patents